United States Patent
Kawamura et al.

(10) Patent No.: US 9,306,735 B2
(45) Date of Patent: Apr. 5, 2016

(54) ELECTRONIC KEY REGISTRATION SYSTEM

(71) Applicant: KABUSHIKI KAISHA TOKAI RIKA DENKI SEISAKUSHO, Aichi (JP)

(72) Inventors: Daisuke Kawamura, Aichi (JP); Yuki Nawa, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 150 days.

(21) Appl. No.: 14/043,081

(22) Filed: Oct. 1, 2013

(65) Prior Publication Data

US 2014/0098958 A1    Apr. 10, 2014

(30) Foreign Application Priority Data

Oct. 10, 2012   (JP) .................................. 2012-225169

(51) Int. Cl.
| | |
|---|---|
| *H04L 9/08* | (2006.01) |
| *B60R 25/24* | (2013.01) |
| *G07C 9/00* | (2006.01) |

(52) U.S. Cl.
CPC . *H04L 9/08* (2013.01); *B60R 25/24* (2013.01); *G07C 9/00309* (2013.01); *G07C 9/00817* (2013.01)

(58) Field of Classification Search
CPC .............. B60R 25/24; G07C 9/00817; G07C 9/00309; H04L 9/08
See application file for complete search history.

(56) References Cited

U.S. PATENT DOCUMENTS

| | | | |
|---|---|---|---|
| 5,708,712 A | 1/1998 | Brinkmeyer et al. | |
| 6,067,028 A | 5/2000 | Takamatsu | |
| 6,204,570 B1* | 3/2001 | Muller | B60R 25/24 180/287 |
| 6,501,369 B1 | 12/2002 | Treharne | |
| 2007/0197261 A1* | 8/2007 | Humbel | G06Q 30/00 455/558 |
| 2013/0285792 A1 | 10/2013 | Shimizu et al. | |
| 2013/0301829 A1 | 11/2013 | Kawamura et al. | |
| 2013/0301834 A1 | 11/2013 | Kawamura et al. | |
| 2013/0329890 A1 | 12/2013 | Kawamura et al. | |
| 2013/0332736 A1 | 12/2013 | Kawamura et al. | |

FOREIGN PATENT DOCUMENTS

| | | |
|---|---|---|
| DE | 4411450 | 3/1995 |
| DE | 19721286 | 9/1998 |

(Continued)

OTHER PUBLICATIONS

Search report from E.P.O., mail date is Jan. 22, 2014.

(Continued)

*Primary Examiner* — William Goodchild
(74) *Attorney, Agent, or Firm* — Greenblum & Bernstein, P.L.C.

(57) ABSTRACT

An electronic key registration system includes an electronic key device having a key ID. A controller having a first piece of information is arranged in a communication subject. A registration tool having a second piece of information is configured to write the key ID to the controller. The controller compares, before electronic key registration, the first piece of information and the second piece of information. The controller permits electronic key registration when the comparison indicates that the first piece of information and the second piece of information conform to each other and prohibits the electronic key registration when the comparison indicates that the first piece of information and the second piece of information do not conform to each other.

7 Claims, 4 Drawing Sheets

(56) References Cited

FOREIGN PATENT DOCUMENTS

| | | |
|---|---|---|
| JP | 07-061328 | 3/1995 |
| JP | 9-256702 | 9/1997 |
| JP | 9-303019 | 11/1997 |
| JP | 2003-148018 | 5/2003 |
| JP | 2004-107959 | 4/2004 |
| JP | 2005-264625 | 9/2005 |
| JP | 2011-020475 | 2/2011 |
| JP | 2011-063938 | 3/2011 |
| JP | 2011-063939 | 3/2011 |
| JP | 2011-111845 | 6/2011 |
| JP | 2011-153420 | 8/2011 |
| JP | 2012-036659 | 2/2012 |
| JP | 2012-070167 | 4/2012 |

OTHER PUBLICATIONS

U.S. Appl. No. 14/058,710 to Daisuke Kawamura et al., which was filed on Oct. 21, 2013.

U.S. Appl. No. 14/044,347 to Daisuke Kawamura et al., which was filed on Oct. 2, 2013.

U.S. Appl. No. 13/930,758 to Kenichi Koga et al., which was filed on Jun. 28, 2013.

Office Action issued in Japan Counterpart Patent Appl. No. 2012-225169, dated Dec. 15, 2015 , along with an English translation thereof.

* cited by examiner

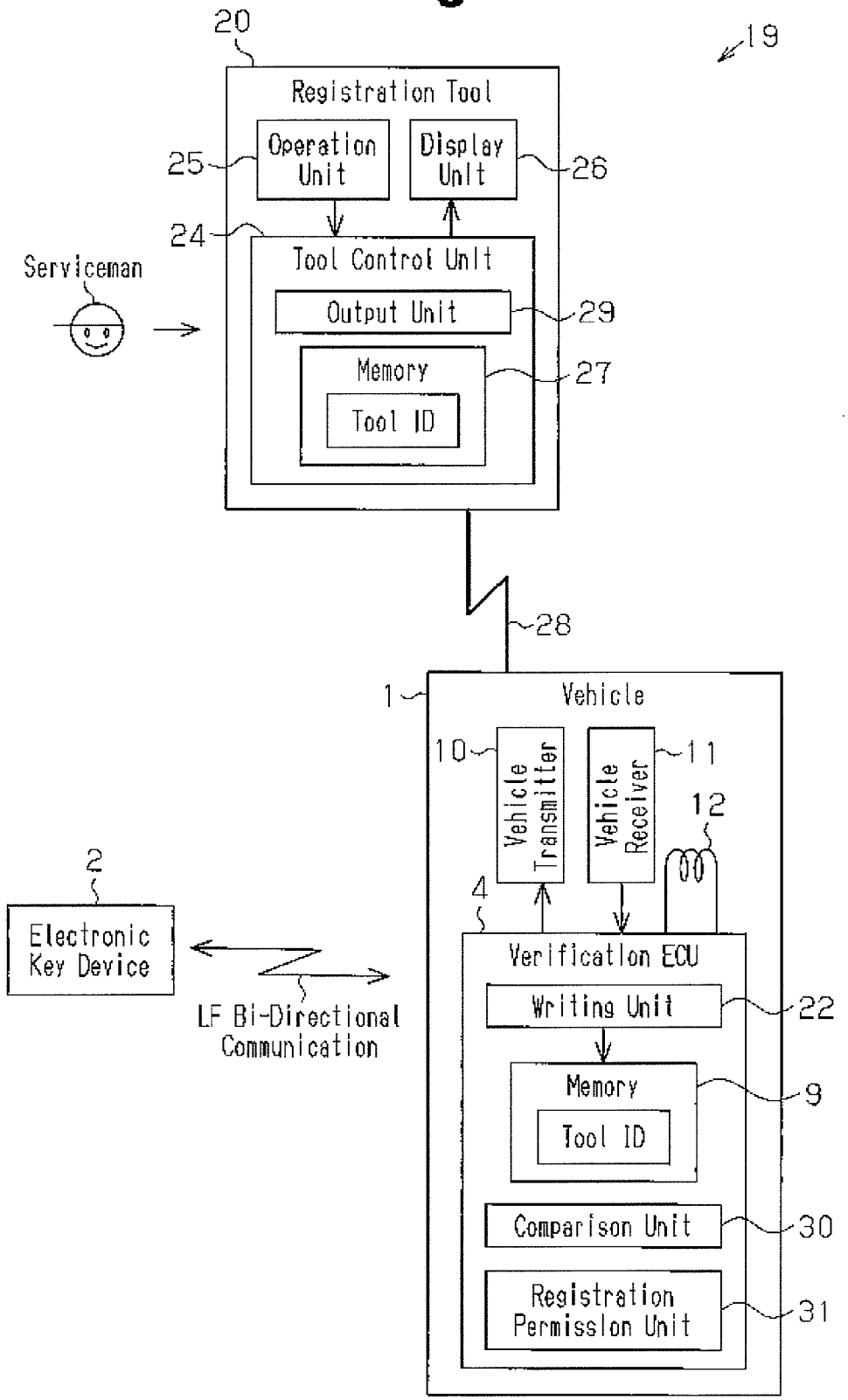

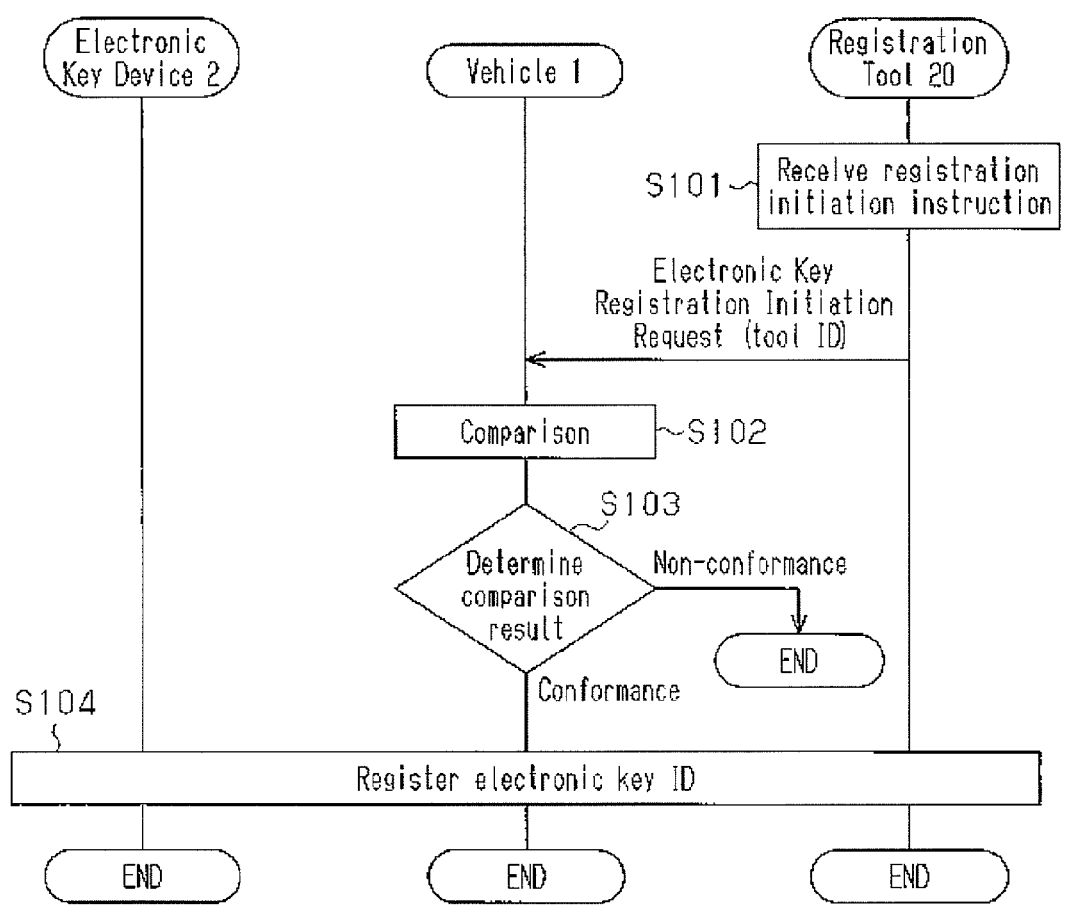

ELECTRONIC KEY REGISTRATION SYSTEM

CROSS-REFERENCE TO RELATED APPLICATIONS

This application is based upon and claims the benefit of priority from prior Japanese Patent Application No. 2012-225169, filed on Oct. 10, 2012, the entire contents of which are incorporated herein by reference.

BACKGROUND ART

The present invention relates to an electronic key registration system that registers an electronic key device to a communication subject.

An electronic key system for a vehicle verifies a key ID transmitted from an electronic key device. Before using the electronic key system, the key ID that is unique to the vehicle key device is registered together with an encryption key to an electronic control unit (ECU) that manages operations of the electronic key system. Japanese Laid-Open Patent Publication Nos. 7-61328, 2003-148018, and 2004-107959 describe examples of electronic key registration systems.

SUMMARY

It is an object of the present invention to provide an electronic key registration system that ensures security for the registration of an electronic key device.

One aspect of the present invention is an electronic key registration system including an electronic key device having a key ID unique to the electronic key device. A controller having a first piece of information is arranged in a communication subject. A registration tool having a second piece of information is configured to write the key ID to the controller. Encrypted communication between the communication subject and the electronic key device is enabled after electronic key registration. One or both of the controller and the registration tool is configured to compare, before electronic key registration, the first piece of information, which is stored in the controller, and the second piece of information, which is stored in the registration tool. The controller permits electronic key registration when the comparison indicates that the first piece of information and the second piece of information conform to each other. The controller prohibits the electronic key registration when the comparison indicates that the first piece of information and the second piece of information do not conform to each other.

A second aspect of the present invention is a method for registering an electronic key device having a key ID to a controller arranged in a communication subject. Encrypted communication between the communication subject and the electronic key device is enabled after electronic key registration. The method includes preparing the controller having a first piece of information; preparing a registration tool having a second piece of information, wherein the registration tool is configured to write the key ID to the controller; comparing, by one or both of the controller and the registration tool, the first piece of information of the controller with the second piece of information of the registration tool before electronic key registration; permitting, by the controller, electronic key registration when the comparison indicates that the first piece of information and the second piece of information conform to each other, and prohibiting, by the controller, the electronic key registration when the comparison indicates that the first piece of information and the second piece of information do not conform to each other.

A third aspect of the present invention is a controller configured to be arranged in a communication subject and for use with an electronic key device having a key ID. Encrypted communication between the communication subject and the electronic key device is enabled after electronic key registration. The controller includes a memory having a first piece of information; a communication circuit that communicates with a registration tool, which stores a second piece of information and writes the key ID to the controller; a comparison unit that compares, before electronic key registration, the second piece of information, which is received from the registration tool, and the first piece of information, which is stored in the memory; and a registration permission unit that permits electronic key registration when the comparison of the comparison unit indicates that the first piece of information and the second piece of information conform to each other and prohibits electronic key registration when the comparison of the comparison unit indicates that the first piece of information and the second piece of information do not conform to each other.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a block diagram of an electronic key registration system; and

FIG. 6 is a diagram illustrating a process for registering the electronic key device.

DETAILED DESCRIPTION OF EMBODIMENT

One embodiment of an electronic key registration system will now be described.

Electronic Key System

Figure 1:
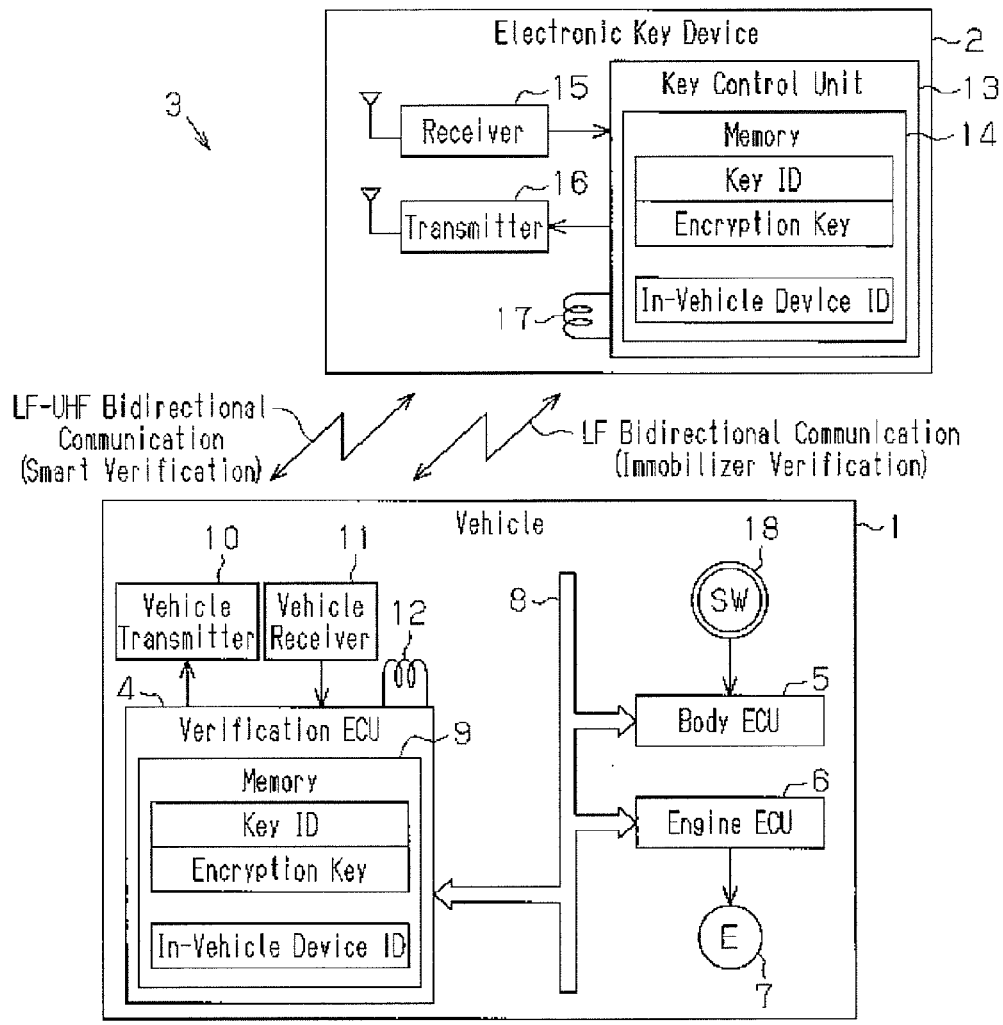
FIG. 1 is a block diagram showing one embodiment of an electronic key system.

FIG. 1 shows an electronic key system 3 for a vehicle 1. One example of the electronic key system 3 is an operation-free key system. When the operation-free key system is activated by a wireless signal output from the vehicle 1, the operation-free key system verifies the ID (key ID) of an electronic key device 2 (smart verification) through short range communication (communication distance of several meters) performed between the vehicle 1 and the electronic key device 2. Another example of the electronic key system 3 is a near-field communication verification system that verifies the key ID through near-field communication.

The vehicle 1 includes a verification ECU 4, which verifies the ID of the electronic key device 2, a body ECU 5, which manages the power supply for in-vehicle electrical devices, an engine ECU 6, which controls the engine 7, and an in-vehicle bus 8, which connects the ECUs 4 to 6. The verification ECU 4 includes a memory 9 that stores a key verification encryption key, which is used for challenge-response verification during verification, and an in-vehicle device ID, which is unique to the vehicle 1. The set of the key ID and the encryption key are associated with the registered electronic key device. The memory 9 of the verification ECU 4, to which a plurality of electronic key devices are registered, stores multiple sets of a key ID and an encryption key in accordance with the number of electronic key devices. The verification ECU 4 is connected to a vehicle transmitter 10, which transmits radio waves on the low frequency (LF) band, a vehicle receiver 11, which receives radio waves on the ultrahigh frequency (UHF) band, and a communication antenna 12, which is used for bidirectional near-field communication on the LF band.

The electronic key device 2 includes a key control unit 13. The key control unit 13 includes a memory 14 that stores a key ID, an encryption key, and an in-vehicle device ID. The key control unit 13 is connected to a receiver 15, which receives radio waves on the LF band, a transmitter 16, which transmits radio waves on the UHF band, and a communication antenna 17, which is used for near-field communication.

Figure 2:
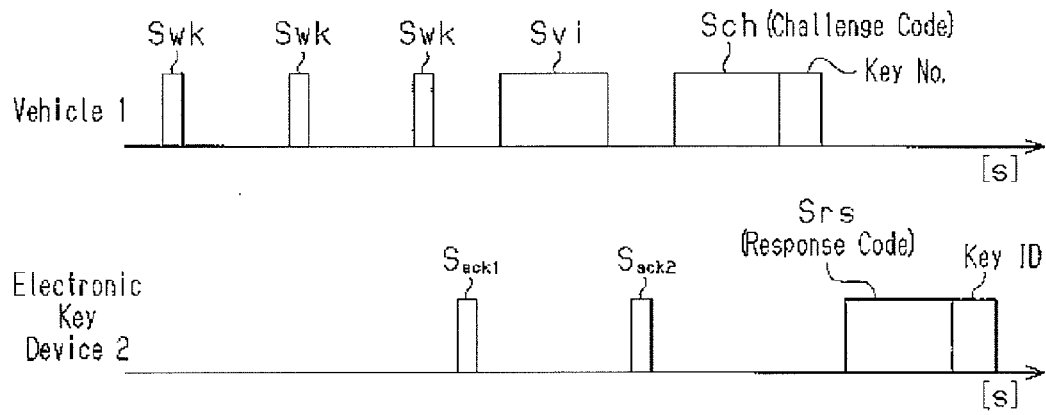
FIG. 2 is a timing chart showing wireless signals output from a vehicle and an electronic key device to verify an ID of an electronic key device.

Referring to FIG. 2, when the vehicle 1 is parked and not moving, the vehicle transmitter 10 repetitively transmits wake signals Swk out of the vehicle 1 in controlled intervals. The electronic key device 2, which is activated when receiving a wake signal Swk, transmits an acknowledgement signal Sack1. When the vehicle receiver 11 receives the acknowledgement signal Sack1, the verification ECU 4 transmits an in-vehicle device ID signal Svi and instructs the electronic key device 2 to verify the in-vehicle ID. When the vehicle device ID is verified, the electronic key device 2 transmits an acknowledgement signal Sack2 to the vehicle 1.

The verification ECU 4 transmits a challenge signal Sch, which is used for challenge-response verification, to the electronic key device 2. The challenge signal Sch includes a challenge code, which changes whenever transmitted, and a key number, which indicates the ordinal number as the key registered to the vehicle 1. When receiving the challenge signal Sch, the electronic key device 2 verifies the key number. When the key number is verified, the electronic key device 2 generates a response code by performing a computation with the received challenge code and the encryption key of the electronic key device 2. The electronic key device 2 transmits a response signal Srs to the vehicle 1. The response signal Srs includes the key ID that is unique to the electronic key device 2. When the vehicle receiver 11 receives the response signal Srs, the verification ECU 4 compares a response code, which is computed by the verification ECU 4 in the same manner, with the response code received from the electronic key device 2 (response verification). The verification ECU 4 also verifies the key ID received from the electronic key device 2 (key ID verification). When the response code and the key ID are both verified, the verification ECU 4 determines that smart verification (exterior smart verification) has been accomplished and permits or performs the locking and unlocking of the vehicle doors with the body ECU 5.

Then, when a driver entering the vehicle 1 is detected by a courtesy switch (not shown) or the like, the vehicle transmitter 10 starts the transmission of wake signals Swk to the interior of the vehicle 1. When the electronic key device 2 receives the wake signal Swk in the vehicle 1 and accomplishes interior smart verification, the verification ECU 4 permits the shifting of power states of the vehicle and the starting of the engine in accordance with the operation of an engine switch 18.

In the near-field communication verification system, the electronic key device 2 may be operated using power radio waves transmitted from the vehicle 1. Thus, the near-field communication verification allows for the electronic key device 2 to be powered without incorporating a physical power supply. The near-field communication verification may be radio frequency identification (RFID) or near-field communication (NFC). The accomplishment of near-field communication verification in the vehicle 1 permits a power shifting operation (engine starting operation) of the vehicle 1 to be performed when the engine switch 18 is operated.

Electronic Key Registration System

In the example shown in FIG. 5, the vehicle 1, the electronic key device 2, and a registration tool 20 configure an electronic key registration system 19. The vehicle 1 includes the verification ECU 4. The electronic key registration system 19 is capable of registering the electronic key device 2 to the vehicle 1 offline without performing network communication through, for example, the Internet. Further, the electronic key registration system 19 is capable of performing both initial registration and additional registration. The initial registration registers the electronic key device 2 for the first time to the vehicle 1. The additional registration registers a sub-key to the vehicle 1 to which the electronic key device 2 has already been registered.

Figure 3:
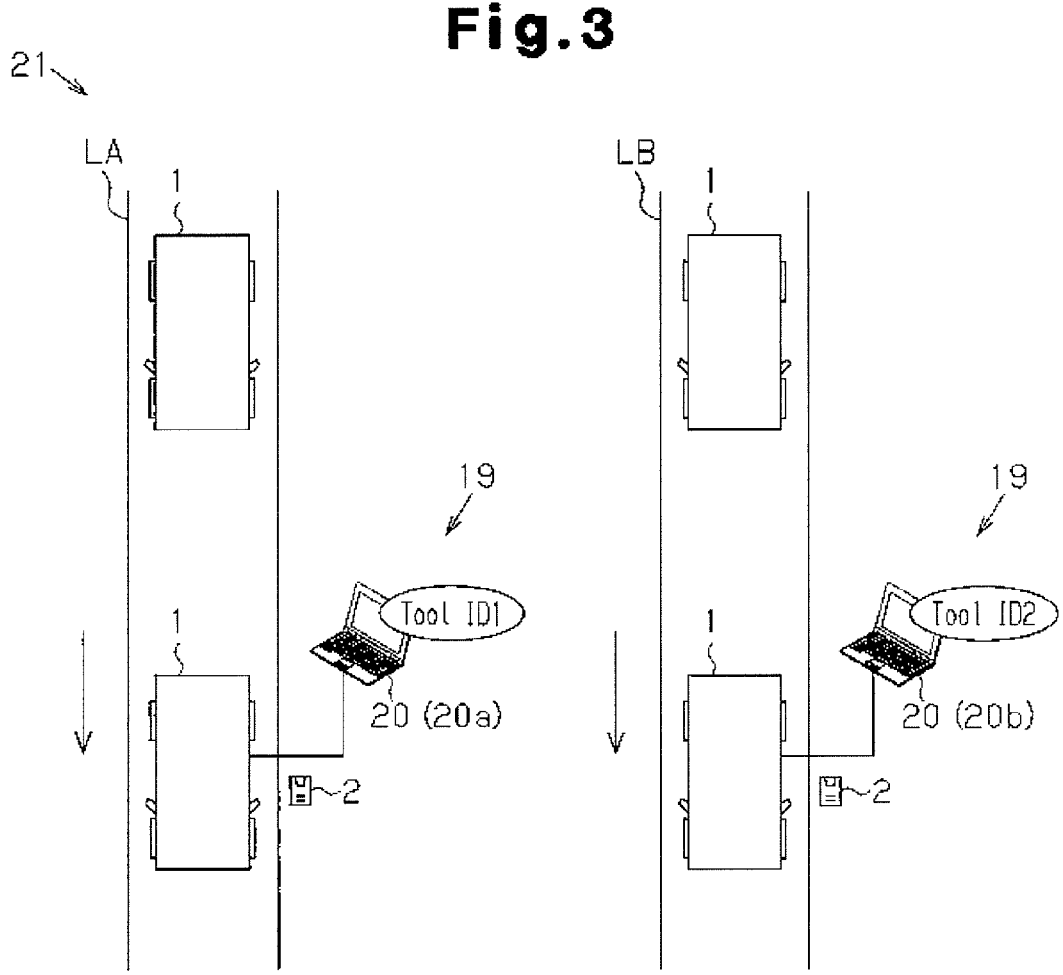
FIG. 3 is a schematic diagram showing a facility for performing electronic key registration.

FIG. 3 shows an electronic key registration facility 21 including assembly lines LA and LB that may be provided in a vehicle manufacturing plant. The electronic key device 2 is registered to the vehicle 1 in each of the assembly lines LA and LB. A registration tool 20a is provided for the assembly line LA, and a registration tool 20b is provided for the assembly line LB. The registration tools 20a and 20b are each used exclusively for the corresponding assembly lines LA and LB. Further, the registration tools 20a and 20b each store a unique registration tool ID (second piece of information). In the present example, the registration tool 20a stores registration tool ID1, and the registration tool 20a stores registration tool ID2.

Figure 4:
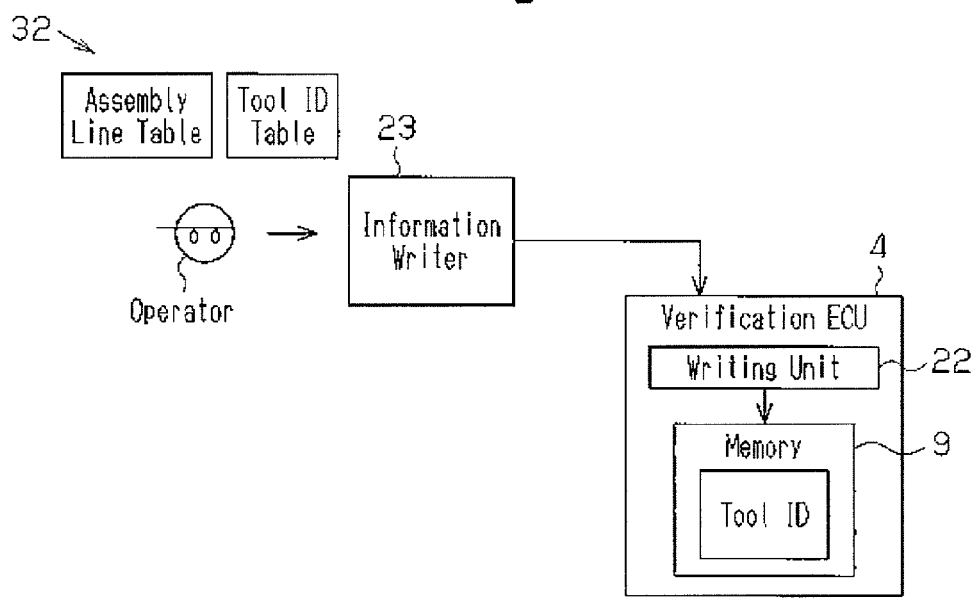
FIG. 4 is a diagram illustrating a process for manufacturing an ECU.

Referring to FIG. 4, the verification ECU 4 stores a registration tool ID (first piece of information). The registration tool ID is provided from an information writer 23 through, for example, a wire connection. The information writer 23 refers to information indicating the corresponding relationship of the verification ECU 4 and the assembly line to provide the verification ECU 4 with the first piece of information, which is the registration tool ID of the registration tool 20 in the assembly line corresponding to the verification ECU 4. In the illustrated example, the verification ECU 4 includes a writing unit 22 and a memory 9. The writing unit 22 writes the registration tool ID, which is provided from the information writer 23, to the memory 9.

Referring to FIG. 5, the registration tool 20 includes a tool control unit 24, an operation unit 25, and a display unit 26. The operation unit 25 may be an input device such as a numerical pad. The display unit 26 includes a screen that shows various messages. Further, the registration tool 20 includes a memory 27 that stores the unique registration tool ID (second piece of information) of the registration tool 20. A communication cable 28 wire-connects the registration tool 20 to the vehicle 1 (verification ECU 4).

The tool control unit 24 provides the vehicle 1 with an electronic key registration initiation request through an output unit 29. The electronic key registration initiation request may include a registration initiation command and the second piece of information, which is the registration tool ID of the registration tool 20.

The verification ECU 4 includes a comparison unit 30 and a registration permission unit 31. The comparison unit 30 verifies the registration tool ID provided from the registration tool 20 with the registration tool ID written to the verification ECU 4. The registration permission unit 31 permits or prohibits electronic key registration in accordance with the verification of the comparison unit 30.

The operation of the electronic key registration system 19 will now be described.

First, the manufacturing of the verification ECU 4 will be described. In the example shown in FIG. 4, a manufacturing plant 32 of the verification ECU 4 is provided with an assembly line table and a registration tool ID table. The assembly line table indicates the assembly line of the vehicle 1 to which the verification ECU 4 is installed. The registration tool ID table indicates the corresponding relationship of the assembly lines and the registration tools 20a and 20b.

In the manufacturing plant 32 where the verification ECU 4 is manufactured, the information writer 23 writes, to the memory 9 of the verification ECU 4, the registration tool ID of the registration tool 20 in the assembly line to which the verification ECU 4 is delivered (ID writing step). For example, when the verification ECU 4 is delivered to assembly line LA, the information writer 23 writes the registration tool ID1 to the memory 9 of the verification ECU 4. When the verification ECU 4 is delivered to assembly line LB, the information writer 23 writes the registration tool ID2 to the memory 9 of the verification ECU 4.

The operation of the registration tool 20 in each assembly line will now be described. Referring to FIG. 6, in step S101, an operator instructs the initiation of registration from the operation unit 25 of the registration tool 20. In response to the registration initiation instruction, the output unit 29 provides the vehicle 1 through the communication cable 28 with an electronic key registration initiation request, which includes the registration tool ID of the registration tool 20 as the second piece of information.

In step S102, the comparison unit 30 of the vehicle 1 compares registration tool IDs in response to the electronic key registration initiation request. For example, the comparison unit 30 compares the registration tool ID received from the registration tool 20 with the registration tool ID stored in the verification ECU 4. The comparison unit 30 generates a result indicating that the two registration tools ID conform to each other (conformance signal) or a result indicating that the two registration tools ID do not conform to each other (non-conformance signal). Steps S101 and S102 configure a comparison step.

In step S103, the registration permission unit 31 permits or prohibits electronic key registration in accordance with the comparison of the comparison unit 30. For example, when the registration tool IDs conform to each other, the registration permission unit 31 permits electronic key registration. When the registration tool IDs do not conform to each other, the registration permission unit 31 forcibly terminates the electronic key registration. Step S103 corresponds to a registration permission step.

When electronic key registration is permitted in step S103, step S104 is performed. In step S104, the electronic key ID and the encryption key of the electronic key device 2 are written to the memory 9 of the verification ECU 4, and the in-vehicle device ID is written to the memory 14 of the electronic key device 2. This registers the electronic key device 2 to the vehicle 1. The key ID, the encryption key, and the in-vehicle device ID may be written in any manner in step S104. For example, the registration processes described in patent applications previously filed by the present applicant may be employed (e.g., Japanese Patent Application No. 2012-018438). The registration of the electronic key device 2 is completed when the key ID and the encryption key are correctly written to the vehicle 1 and the in-vehicle ID is correctly written to the electronic key device 2.

The above embodiment has the advantages described below.

(1) Prior to the registration of the electronic key device 2, the registration tool ID serving as the first piece of information is stored in the verification ECU 4 (controller), and the registration tool ID serving as the second piece of information is stored in the registration tool 20. The electronic key registration system 19 compares the first piece of information (registration tool ID) stored in the verification ECU 4 and the second piece of information (registration tool ID) stored in the registration tool 20. When the comparison obtains a conforming result, electronic key registration is permitted. When the comparison obtains a non-conforming result, electronic key registration is prohibited. This allows for only an authorized registration tool to register an electronic key to the verification ECU 4. Thus, when someone obtains a stolen or duplicated registration tool, that person cannot register an electronic key device as long as the registration tool IDs are not in conformance. This improves security for electronic key registration.

(2) The verification ECU 4 is configured to store the ID of the registration tool 20 as the first piece of information when the verification ECU 4 is manufactured. The ID of the registration tool 20 may easily be written to the verification ECU 4 when the verification ECU 4 is manufactured.

(3) The registration tool 20 is configured to provide the verification ECU 4 with the registration tool ID as the second piece of information in response to an instruction for initiating electronic key registration. The verification ECU 4 is configured so that after receiving the registration tool ID serving as the second piece of information from the registration tool, the verification ECU 4 compares the received registration tool ID with the registration tool ID serving as the first piece of information stored in the verification result. Since the verification ECU 4 performs the comparison of the registration tool IDs, the registration tool 20 does not need such a comparison result. This simplifies the configuration of the registration tool 20.

(4) In one example, a registration tool ID is assigned for each assembly line. In this case, when someone obtains a stolen or duplicated registration tool, the ID of the registration tool would not conform to the registration tool ID stored in the verification ECU 4. This improves security for electronic key registration.

(5) The registration tool ID of the registration tool 20 is associated with the location where the electronic key device 2 is registered (e.g., assembly line for which the registration tool 20 is used, plant, and geographical area). The registration tool is stored in advance in the verification ECU 4. The registration tool 20 and the verification ECU 4 are used for the registration of the electronic key device 2. Accordingly, the registration tool 20 may compare tool IDs offline without performing network communication.

It should be apparent to those skilled in the art that the present invention may be embodied in many other specific forms without departing from the spirit or scope of the invention. Particularly, it should be understood that the present invention may be embodied in the following forms.

The electronic key ID registration of step S104 may be performed online in which at least one of the vehicle 1, the electronic key device 2, and the registration tool 20 can access an information center through a communication network such as the Internet.

The registration tool ID does not have to be written to the verification ECU 4 when the verification ECU 4 is manufactured. The registration tool ID may be written during the period from after the verification ECU 4 is manufactured to when the electronic key device is registered.

The registration tool ID does not have to be assigned to each assembly line. For example, the registration tool ID may be assigned to each plant and/or geographical location where electronic key registration is performed. When someone obtains a stolen or duplicated registration tool, the ID of the registration tool would not conform to the registration tool ID stored in the verification ECU 4. This improves security for electronic key registration. Further, the total number of registration tool IDs is relatively small. This facilitates management of the registration tool IDs.

In the same plant, the registration tool may store different registration IDs for different vehicle types. In this case, when using a stolen or duplicated registration tool, the registration of an electronic key device is difficult. This improves security for electronic key registration.

The information writer 23 is not limited to an independent instrument. The information writer 23 may be a single function of a computer.

The verification ECU 4 and the information writer 23 may communicate with each other through a wireless connection.

The registration tool ID may be deleted from the verification ECU 4 after the electronic key registration.

The comparison of the registration tool IDs may be performed by the registration tool 20 instead of the verification ECU 4.

The electronic key system 3 may be changed to a different key system such as a wireless key system. A wireless key system verifies a key ID through, for example, narrowband communication that is commenced by a wireless signal transmitted from an electronic key device 2.

The verification sequence of the electronic key device 2 may be changed. For example, the electronic key device 2 may simultaneously transmit the in-vehicle device ID, the key number, and the challenge-response code.

The key ID and the encryption key may be shared by the operation-free key system and the near-field communication system.

The vehicle 1 and the electronic key device 2 may be wire-connected for communication during registration of the electronic key device.

During registration of an electronic key device, the vehicle 1 and the electronic key device 2 may communicate with each other through, for example, a communication circuit or communication function of an operation-free key system. Alternatively, communication may be performed through any communication circuit or communication function of a system other than an operation-free key system and a near-field communication system.

Wireless communication may be performed between the vehicle 1 and the registration tool 20.

The ID comparison does not have to be performed to verify the registration tool ID. Other IDs or information may be used as long as the verification ECU 4 and the registration tool 20 can be verified.

The encryption key is not limited to challenge-response verification as long as it is a key used for encrypted communication between two parties.

The verification ECU 4 serves as a controller. However, the controller only needs to be a control unit located at the registration subject of the key ID.

The first piece of information and the second piece of information may be a string of characters, numbers, and symbols or a combination thereof.

The first piece of information and the second piece of information do not have to identify the registration tool 20 and may be, for example, information dedicated to key registration.

The key providing step may be performed, for example, automatically under the control of a predetermined controller.

The registration tool 20 may be incorporated in the vehicle 1.

The communication subject is not limited to the vehicle 1 and may be a device or instrument other than the vehicle 1.

The present examples and embodiments are to be considered as illustrative and not restrictive, and the invention is not to be limited to the details given herein, but may be modified within the scope and equivalence of the appended claims.

The invention claimed is:

1. An electronic key registration system comprising:
an electronic key device having a key ID unique to the electronic key device;
a controller having a first piece of information, wherein the controller is configured to be arranged in a communication subject; and
a registration tool having a second piece of information that is a registration tool ID of the registration tool, wherein the registration tool is configured to write the key ID to the controller, and the registration tool ID of the registration tool differs depending on a first use location of the registration tool, wherein
encrypted communication between the communication subject and the electronic key device is enabled after electronic key registration,
one or both of the controller and the registration tool is configured to compare, before the electronic key registration, the first piece of information, which is stored in the controller, and the second piece of information, which is stored in the registration tool,
the controller is configured to permit the electronic key registration when the first piece of information and the second piece of information conform to each other,
the controller is configured to prohibit the electronic key registration when the first piece of information and the second piece of information do not conform to each other, and
the controller is configured to store in advance the first piece of information that is an ID of an authorized registration tool authorized to register the electronic key device to the controller, the ID of the authorized registration tool corresponding to a second use location of the authorized registration tool,
wherein each of the first piece of information and the second piece of information corresponds to a specific plant where the electronic key registration is performed.

2. The electronic key registration system according to claim 1, wherein the controller is configured to store the ID of the authorized registration tool as the first piece of information when the controller is manufactured.

3. The electronic key registration system according to claim 1, wherein
the registration tool is configured to provide the controller with the second piece of information when receiving an instruction to initiate the electronic key registration, and after receiving the second piece of information from the registration tool, the controller is configured to compare the second piece of information, which is received from the registration tool, and the first piece of information, which is stored in the controller.

4. The electronic key registration system according to claim 1, wherein each of the first piece of information and the second piece of information further corresponds to a specific assembly line.

5. A method for registering an electronic key device having a key ID to a controller arranged in a communication subject, wherein encrypted communication between the communication subject and the electronic key device is enabled after electronic key registration, the method comprising:
   preparing the controller having a first piece of information;
   preparing a registration tool having a second piece of information that is a registration tool ID of the registration tool, wherein the registration tool is configured to write the key ID to the controller, and the registration tool ID of the registration tool differs depending on a first use location of the registration tool;
   comparing, by one or both of the controller and the registration tool, the first piece of information, which is stored in the controller, with the second piece of information, which is stored in the registration tool, before the electronic key registration;
   permitting, by the controller, the electronic key registration when the first piece of information and the second piece of information conform to each other;
   prohibiting, by the controller, the electronic key registration when the first piece of information and the second piece of information do not conform to each other, wherein
   the preparing the controller includes storing in advance the first piece of information that is an ID of an authorized registration tool authorized to register the electronic key device to the controller, the ID of the authorized registration tool corresponding to a second use location of the authorized registration tool, and
   each of the first piece of information and the second piece of information corresponds to a specific plant where the electronic key registration is performed.

6. The method according to claim 5, wherein the preparing the controller includes writing, by an information writer that differs from the registration tool, the first piece of information to the controller.

7. A controller configured to be arranged in a communication subject and for use with an electronic key device having a key ID, wherein encrypted communication between the communication subject and the electronic key device is enabled after electronic key registration, the controller comprising:
   a memory having a first piece of information;
   a communication circuit that communicates with a registration tool, which stores a second piece of information and writes the key ID to the controller, wherein the second piece of information is a registration tool ID of the registration tool that differs depending on a first use location of the registration tool;
   a comparator that compares the second piece of information, which is received from the registration tool, and the first piece of information, which is stored in the memory, before the electronic key registration; and
   a registrar that permits the electronic key registration when the first piece of information and the second piece of information conform to each other and prohibits the electronic key registration when the first piece of information and the second piece of information do not conform to each other, wherein
   the controller is configured to store in advance the first piece of information that is an ID of an authorized registration tool authorized to register the electronic key device to the controller, the ID of the authorized registration tool corresponding to a second use location of the authorized registration tool, and
   each of the first piece of information and the second piece of information corresponds to a specific plant where the electronic key registration is performed.

* * * * *